United States Patent

[11] 3,551,661

[72] Inventors Arthur E. Bliss
Sunnyvale;
William A. Lloyd, San Jose, Calif.

[21] Appl. No. 755,849
[22] Filed Aug. 28, 1968
[45] Patented Dec. 29, 1970
[73] Assignee Varian Associates
Palo Alto, Calif.
a corporation of California

[54] DIODE DECODING CIRCUIT FOR SELECTIVELY ENERGIZING AN ARRAY OF ELECTROGRAPHIC WRITING ELECTRODES
4 Claims, 3 Drawing Figs.

[52] U.S. Cl. .......... 235/155, 340/347
[51] Int. Cl. .......... H03k 13/02
[50] Field of Search .......... 340/347; 235/155

[56] References Cited

UNITED STATES PATENTS

| | | | |
|---|---|---|---|
| 3,469,254 | 9/1969 | Goosey .......... | 340/347 |
| 3,419,887 | 12/1968 | Moran .......... | 340/347 |

*Primary Examiner*—Maynard R. Wilbur
*Assistant Examiner*—Jeremiah Glassman
*Attorneys*—William J. Nolan and Leon F. Herbert

ABSTRACT: An electrographic apparatus such as a recorder or printer is disclosed. The electrographic apparatus includes means such as an analog-to-digital converter or conventional digital circuit for producing a coded binary output signal representative of information to be electrographically portrayed. An array of separately energizable electrographic writing electrodes are arranged over an electrographic recording medium for depositing a charge image pattern on the recording medium containing the information to be recorded. A diode decoding circuit for each electrode is connected in circuit intermediate the source of binary coded signals and the electrographic writing electrodes for decoding the binary output signal and for applying the writing potential to separate ones of the array of writing electrodes to produce the charge image pattern on the recording medium. Each diode decoding circuit includes a series connection of a relatively high and a relatively low resistance connected across the source of writing potential. The writing electrode is connected intermediate the resistances for applying the writing potential developed across the high resistance to the electrode. A second circuit branch consisting of a diode and a third resistor is connected in shunt with the high resistance. A first gate is connected in series with the potential divider network for supplying one binary input to the diode decoder. A second gate is connected in series with the third resistor for selectively controlling the bias on the diode to selectively control the shunting effect of the parallel branch, thereby providing the second binary data input to the diode decoder. The diode decoder circuits are interconnected in a matrix in such a manner that the first gate supply first decade inputs and the second gate provides second decade inputs and inputs from both gates must be obtained to cause a writing potential to be applied to the writing electrode.

INVENTORS
ARTHUR E. BLISS
WILLIAM A. LLOYD
BY Wm J Nolan
ATTORNEY

INVENTORS
ARTHUR E. BLISS
WILLIAM A. LLOYD
BY Wm J Nolan
ATTORNEY

DIODE DECODING CIRCUIT FOR SELECTIVELY ENERGIZING AN ARRAY OF ELECTROGRAPHIC WRITING ELECTRODES

DESCRIPTION OF THE PRIOR ART

Heretofore, electrographic display devices have employed a series connection of transistors for decoding the binary data output and for applying the writing potential to the selected ones of the electrographic electrodes. Such a circuit is described and claimed in copending U.S. application Ser. No. 661,872 filed Aug. 21, 1967 and assigned to the same assignee as the present invention. While such a series connection of transistors is capable of providing extremely fast writing times, such transistors are relatively expensive and for electrographic display devices not requiring such fast writing speeds, the use of such transistors results in undue complexity and manufacturing cost.

Conventional diode decoder circuits may be employed for decoding the binary data output and for applying the writing potential to selected ones of the writing electrodes. Such a conventional diode decoding circuit is described in a text entitled "Logic Design of Digital Computers" by Montgomery Phillip Phister, published by Wiley in 1959 (see page 23). The problem with using the conventional diode decoding circuit is that for the relatively high writing potentials required for electrographic writing, substantial power is dissipated in each of the decoding circuits connected to each of the writing electrodes during the nonwriting or quiescent state for each of the electrodes.

Therefore a need exists for an improved diode decoding circuit which will be capable of applying the relatively high writing potentials to the selected ones of the writing electrodes and at the same time substantially reducing the power consumption of the diode decoding circuit for the nonwriting condition.

SUMMARY OF THE PRESENT INVENTION

The principal object of the present invention is the provision of an improved diode decoding circuit for selecting and energizing an array of electrographic writing electrodes.

One feature of the present invention is the provision of a diode decoding circuit, for selectively energizing an array of electrographic writing electrodes which consists of a series connection of a relatively large and a relatively small impedance and a gate forming a gated potential dividing network with the large impedance developing the writing potential applied to the electrode, such decoding circuit also including a parallel circuit branch consisting of a diode and a resistor connected to selectively shunt the high series impedance in response to the output of a second gate whereby both of the gating signals must be applied to the decoding circuit to cause a writing potential to be applied to the writing electrode.

Another feature of the present invention is the same as the preceding feature wherein the diode decoding circuit includes a second diode connected in the series potential dividing branch intermediate the high and low impedances and in parallel with the shunt branch, the second diode being connected to block charging of the writing electrode's stray capacitance through the parallel shunting branch to increase the writing time of the writing electrode.

Another feature of the present invention is the same as any one or more of the preceding features wherein the first and second gates have nonwriting impedances large compared to the impedance through the respective circuit branch gated by the respective gate.

Other features and advantages of the present invention will become apparent upon a perusal of the following specification taken in connection with the accompanying drawings wherein:

DESCRIPTION OF THE PREFERRED EMBODIMENTS

Figure 1:
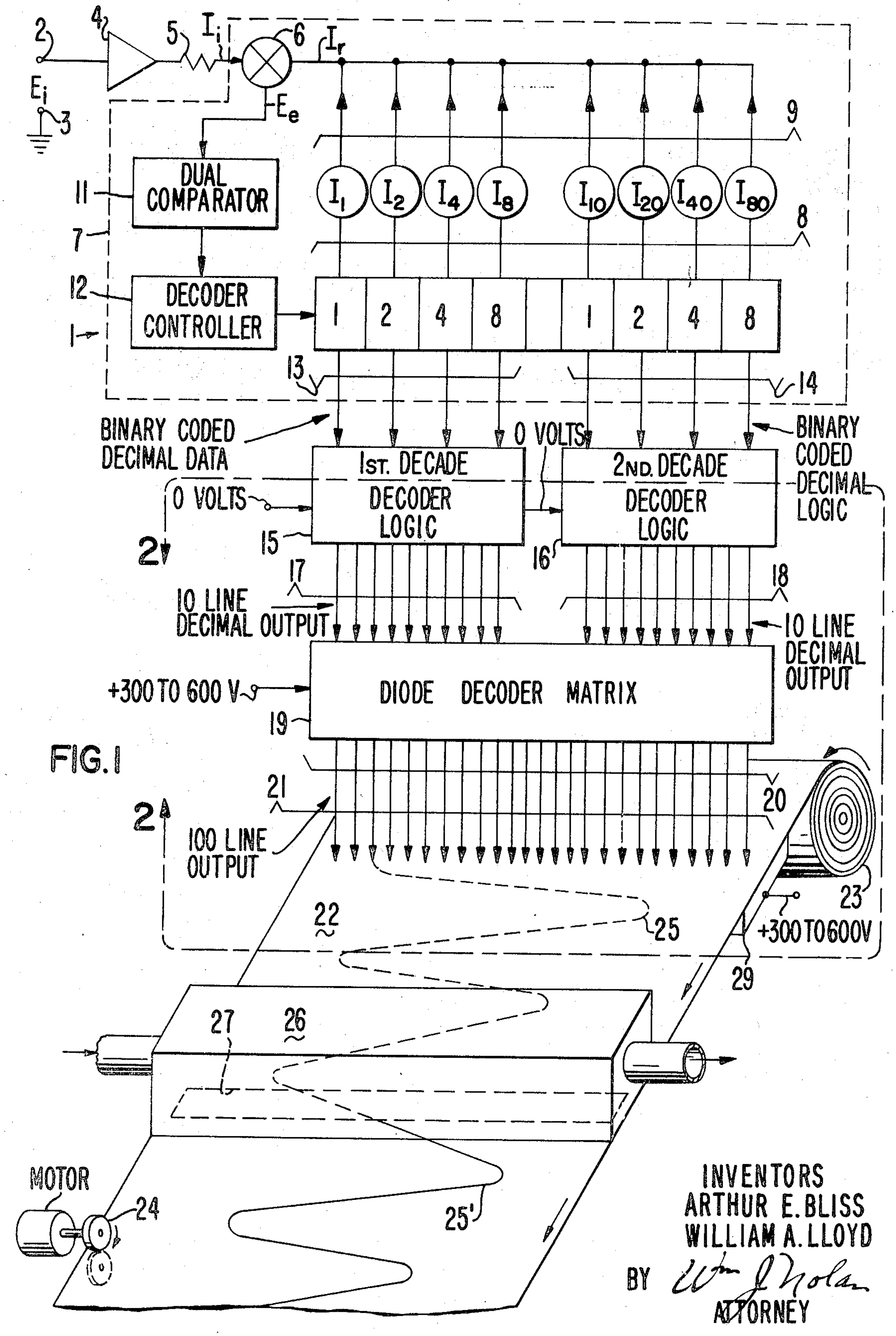
FIG. 1 is a schematic block diagram, partly in perspective, of an electrographic apparatus incorporating features of the present invention.

Referring now to FIG. 1, there is shown an electrographic recorder 1 incorporating features of the present invention. Although the invention will be described in detail as employed in an electrographic recorder, it is to be understood that the diode decoding circuit hereinafter described may be employed in various types of electrographic writing devices such as electrographic printers or other display devices for electrographically printing the output from a binary data output device. The electrographic recorder 1 includes such a binary data output device, and, thus, is one example of an electrographic apparatus which may employ the diode decoding circuit of the present invention. The recorder 1 includes a pair of input terminals 2 and 3 to which is applied an input signal $E_i$ to be measured. The input signal is fed to a preamplifier 4 wherein it is amplified and fed via resistor 5 to one input of an error detector 6. The series resistor 5 converts the input voltage $E_i$ into an input current $I_i$ to be compared in the error detector 6.

The error detector 6 forms a portion of an analog-to-digital converter 7. The analog-to-digital converter 7 includes a dual decade up-down counter circuit 8. One output of the counter circuit 8 is fed to an array of current generators 9 for generating a current $I_r$ corresponding in amplitude to the count in the counter circuit 8. The output current $I_r$ of the counter forms a reference feedback current fed to the other input of the error detector 6 for comparison with the input signal $I_i$ to be measured.

The output of the error detector 6 is an error voltage $E_e$ which is fed to one input of a dual comparator 11 which compares the error voltage $E_e$ against a pair of reference levels corresponding to the upper and lower level of a dead zone having a width preferably equal to the voltage difference represented by adjacent numerical counts of the counter circuit 8. The output of the dual comparator 11 is a binary coded signal indicative of null balance of the analog-to-digital converter and can take any one of three possible forms. One output is a DON'T COUNT command corresponding to an error voltage $E_e$ falling within the dead zone of the comparator 11. A second output of the dual comparator 11 is an UP COUNT command produced when the error voltage $E_e$ is above the upper level of the dead zone. A third output of the dual comparator is a DOWN COUNT command obtained when the error voltage $E_e$ is below the lower level of the dead zone. The output of the dual comparator 11 is fed to a decoder controller 12 which decodes the binary count commands and feeds a control signal to the counter circuit 8 causing the counter 8 to track the input signal $E_i$. Another output of the counter circuit 8 is a binary coded decimal data output, one of such outputs being provided for each decade of the dual decade counter 8.

The first decade binary decimal coded data output 13 is fed to a first decade decoder logic circuit 15 and the second decade binary decimal coded data output 14 of the second decade of the counter 8 is fed to a second decade decoder logic circuit 16. Each of the decoder logic circuits 15 and 16 converts its input into a 10 line decimal output 17 and 18, respectively. The two 10 line decimal outputs 17 and 18 are fed to a diode decoder matrix circuit 19 which converts the 10 line decimal inputs into a 100 line binary data output 20 fed to an array of 100 signal tracing electrodes 21 disposed crosswise of a strip of electrographic recorder paper 22 pulled from a supply roll 23 past the writing array 21 by means of a motor driven friction drive wheel 24.

The 100 line binary data output applied to the writing array 21 selectively energizes the proper one of the electrodes to lay down a charge image 25 on the charge retentive surface of the electrographic recording paper 22. An inking channel 26 is disposed across the recording paper 22 and includes an inking slot 27 cut through one sidewall of the channel 26 to permit liquid ink flowing through the channel 26 to come into fluid contact with the charge image to be developed on the electrographic recording paper 22. The ink includes colloidally suspended positively charged toner particles which are attracted to the negative charge image 25 for developing same at 25'.

The diode decoder matrix 19 includes an array of diodes and resistors more fully described below with regard to FIG. 2, for selectively applying a relatively high writing potential to the electrodes of the array 21. More specifically, the writing electrode structure includes a writing electrode plate 29 disposed on the opposite side of the electrographic paper 22 from the writing array 21 and operated at a relatively high potential as of plus 600 to 900 volts. It typically takes approximately minus 500 volts on the writing electrodes 21 with respect to the electrode plate 29 to deposit a charge image on the charge retentive surface of the recording paper 22. A relatively high positive potential as of plus 300 to 600 volts is applied to all of the electrodes of the array 21 with the exception of the electrode which is to perform the writing. The diode decoder matrix 19 selects the proper writing electrode and selectively drops the potential on the selected electrode from plus 300 to 600 volts to ground potential by opening a gate circuit between the electrode and ground. When the selected electrode 21 is gated to ground potential a minus 600 to 900 volts appears on that electrode relative to the plate electrode 29 such that a charge image is deposited on the recording web 22.

Figures 2, 3:
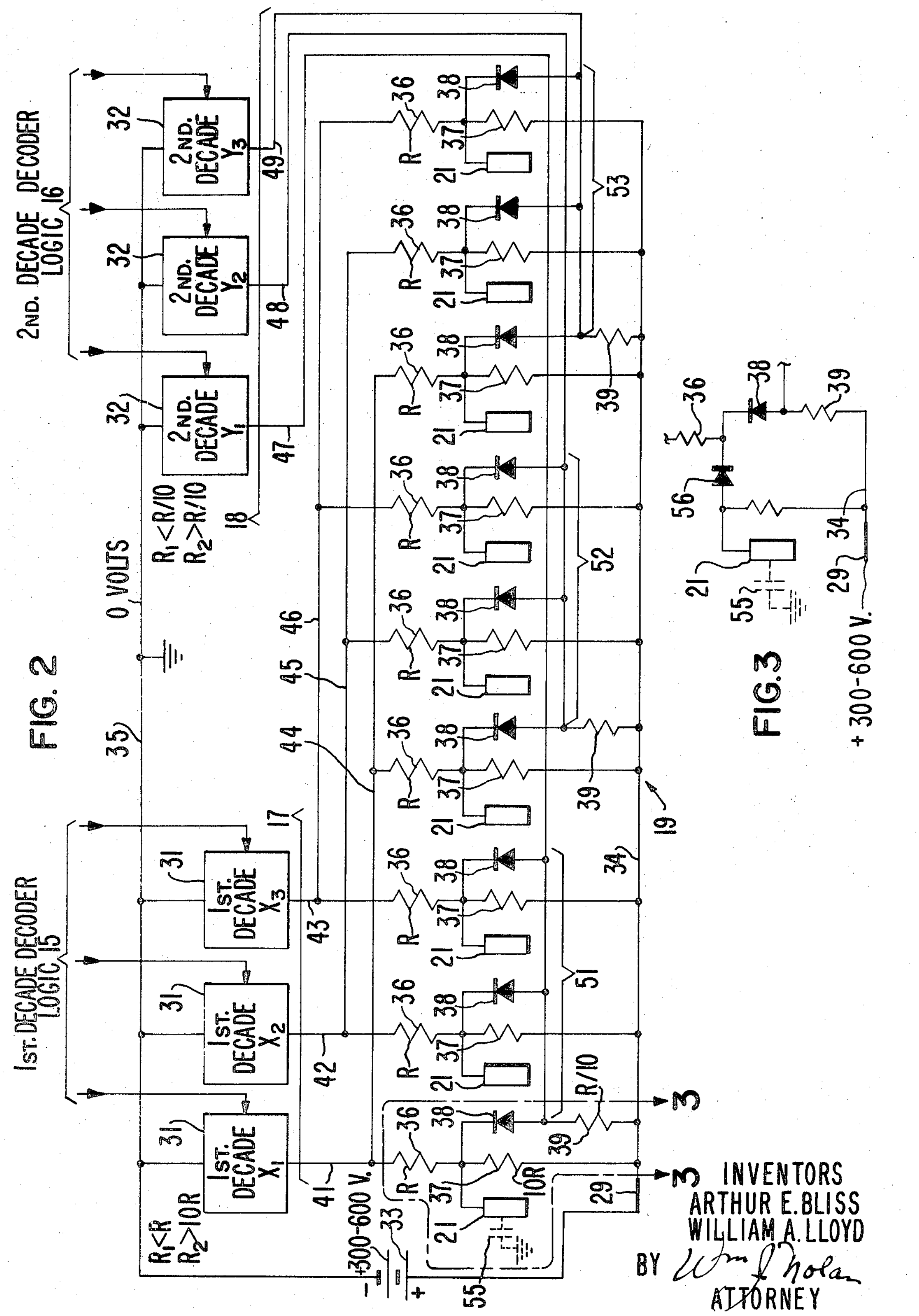
FIG. 2 is a schematic circuit diagram, partly in block diagram form, depicting the diode decoding circuit of the present invention and comprising that portion of the circuit of FIG. 1 delineated by line 2–2.
FIG. 3 is a schematic circuit diagram of an alternative diode decoding circuit portion delineated by line 3–3 of FIG. 2.

Referring now to FIG. 2, the diode decoder matrix 19 is shown in greater detail. For the sake of simplicity of explanation, the diode decoder matrix 19 of FIG. 2 will be described as employed with a three line output 17 from the first decade decoder 15 and a three line output from the second decoder 16 for application to a writing array 21 containing 9 writing electrodes. In other words, the output of the diode decoder matrix 19 is described and shown as a 9 line output instead of the 100 line output of the recorder or any arbitrary number of lines, such as 800, obtained, for example, from the binary coded data output from an electrographic character printer.

The diode decoding matrix 19 includes an array of AND circuits, one AND circuit for energizing each of the writing electrodes 21. Each AND circuit includes a certain combination of resistors and a diode generally indicated by that portion of the circuit of FIG. 2 encircled by line 3–3. In order for the writing potential to be applied to the writing electrode 21, the AND circuit must receive an input from both the first decade decoder logic circuit 16. Each of the decade decoder logic circuits 15 and 16, respectively, includes a set of output drivers or gates, namely, first decade drivers 31 and second decade drivers 32, there being one of the drivers in each of the output lines from each of the decade decoder logic circuits 15 and 16, respectively. The decade driver circuits 31 and 32 are each connected in series with at least a portion of each of the AND diode decoding circuits across a source of writing potentials 33, as of +300 to 600 volts. The +300 to 600 volts is applied to a bus 34 and the negative or ground potential is applied to the decade decoder logic circuits 15 and 16 via bus 35. The decade driver circuits 31 and 32 serve as gates for gating the writing potential to the AND circuits.

Each of the AND circuits includes a series connection of a first resistor 36, of a resistance R, and a second resistor 37 of a resistance substantially greater than R, such as 10R. The series connection of resistors 36 and 37 with the first decade driver circuits 31 serves as a potential dividing network for developing the writing potential across the large resistance of resistor 37 when the series connected driver or gate 31 is in the conducting condition. The drivers 31 have a conducting resistance $R_1$ which is much less than the resistance of resistor 36. They also have a nonconducting resistance which is substantially larger than the resistance of the large resistance 37. The writing electrodes 21 are connected intermediate resistors 36 and 37.

The writing potential developing resistor 37 is shunted by a parallel branch consisting of a diode 38 and a resistor 39 having a resistance substantially less than the resistance of resistor 36, such as $\frac{R}{10}$. The diode 38 is connected for shunting the high resistance of resistor 37 such that when diode 38 is conducting, which is its normal condition, the writing electrode 21 will be operating at nearly the same potential as bus 34. The resistor 39, in the shunt branch, is series connected with the second decade driver circuits 32 across the source of writing potential 33. The second decade driver circuits 33 have a conducting resistance $R_1$ which is substantially less than the resistance of the shunt resistor 39, whereas their nonconducting resistance $R_2$ is much greater than the resistance of the shunt resistor 39.

Thus, when the second decade driver 32 is in a conducting state substantially the entire writing potential is dripped across resistor 39, thereby biasing diode 38 into a nonconducting state to eliminate the shunting effect of the parallel branch including the diode 38 and resistor 39. When the shunt effect of diode 38 is removed and and the driver or gate 31 is open or conducting, the writing potential is developed across the resistor 37. Conversely, when the first decade driver circuit 31 or gate is in a nonconducting state, its impedance is substantially larger than the impedance of resistor 37 such that substantially the entire potential of source 33 is dropped across the gate or driver impedance such that the potential applied to the electrode 21 is substantially the same potential as that applied to bus 34 such that no writing can occur.

The second writing electrode 29, shown in FIG. 1, can be operated at a potential different from that of bus 34; for example, at a potential more positive than bus 34 to enhance writing by the electrode 21 with a lower potential supplied to the bus 34. For example, bus 34 may be operated at +300 volts, whereas the writing electrode 29 may be operated at 300 volts more positive, namely, at +600 volts with such potential applied to the second electrode 29 being pulsed from +300 to +600 volts when it is desired to write.

Each output line 41—43 of the first decade decoder logic circuit respectively is connected to every third one of the AND circuits via busses 44—46, respectively. Similarly, each output line 47—49 of the second decade decoder logic circuit 16 connected to each adjacent group of three AND circuits via busses 51—53, respectively. The output lines 41—46 and 47—53 together with the AND circuits form an X–Y orthogonal matrix type decoder.

In operation, when both driver circuits 31 and 32 are in the nonconducting state, such that the diode 38 is conducting, the potential applied to the writing electrode 21 is substantially the same as the potential applied to the bus 34 such that no writing occurs and substantially no current flows through the diode decoding matrix 19. In this manner the power dissipation of the decoding matrix 19, in the quiescent or nonwriting condition, is only the power dissipation associated with the leakage currents which are extremely small. This constitutes a major improvement over the prior art high voltage diode decoding circuits which consumed substantial power in the nonwriting condition.

When the first decade driver circuit 31 is switched to the conducting state while the second decade driver for the respective AND circuit remains in a nonconducting state, the shunting branch, including resistor 39 and diode 38, continues as an effective shunt having a very low impedance compared to the resistance of series resistor 36 such that the potential applied to the writing electrode 21 is substantially the potential of the bus 34 and no writing occurs. On the other hand, if the second decade driver 32 is switched to the conductive condition and the first decade driver 31 remains in a nonconduction condition, the shunt diode 38 is switched to a nonconductive state, thereby removing the shunt, but the potential dropped by the high resistor 37 is still smaller than that dropped across the nonconducting driver 31 or gate such that the potential applied to the writing electrode 21 remains substantially at the potential of the bus 34 and no writing occurs.

In the "write" condition, the respective one of the first decade drivers 31 or gates is in the conductive condition and the respective one of the second decade drivers or gate circuits 32 is in the conductive condition, the shunting effect of diode 38 is removed such that substantially the entire writing potential of 300 to 600 volts is developed across the large potential dividing resistor 37. This potential is applied to the writing electrode 21 cause writing on the electrographic recording medium.

The writing electrode 21 has a substantial stray capacitance to ground. This stray capacitance is indicated by capacitor 55 and typically has a value which falls within the range of 60 to 100 p.f. In order for the potential on the writing electrode 21 to be dropped to nearly ground potential for writing, the charge on the stray capacitance 55 must first be discharged through resistor 36 and the conductive state impedance of the first decade driver circuit 31. A typical value for resistor 36 is 100 Ω. The input pulse length to the AND circuit from the driver circuits 31 and 32 is typically 20 microseconds. The typical turn-on time for the aforementioned values of resistance and capacitances is typically 10 microseconds. To remove the writing potential applied to the writing electrode 21, the drivers 31 and 32 are switched to the nonconducting state, thereby biasing the diode 38 into the conducting condition. The stray capacitance of the writing electrode 21 is then charged to the potential of bus 34 through the relatively low impedance of resistor 39 and the diode 38 to the substantially potential of bus 34.

Referring now to FIG. 3, there is shown an alternative diode decoding circuit to be employed in the diode decoding matrix 19 when it is desired to stretch the writing time of each of the electrodes 21. The circuit is substantially the same as that previously described with regard to FIG. 2 with the exception of the provision of a second diode 56 connected intermediate the resistors 36 and 37 and in parallel with the parallel shunting branch consisting of diode 38 and resistor 39. The circuit of FIG. 3 operates identically to that previously described with regard to FIG. 2 with the exception that during the turn-off time, i.e., time to remove the writing potential on electrode 21, the stray capacitance 55 of the writing electrode 21 cannot be charged through the shunting branch consisting of diode 38 and resistor 39 due to the provision of the diode 56. Thus, the stray capacitance 55 of the writing electrode 21 must be charged through the relatively high resistance of resistor 37. In a typical example, resistor 37 has a resistance of approximately 1 Ωsuch that the turn-off time is increased to approximately 100 microseconds. This pulse-stretching effect, provided by diode 56, allows a writing electrode 21 to be selected by a relatively short pulse while permitting the writing potential to be maintained for a relatively long time which would otherwise be normally achieved with long writing pulses, thereby slowing the writing speed of the apparatus.

The first and second decade drivers circuit 31 and 32 comprise, for example, conventional active pullup transistor circuits similar to a dual buffer element such as Fairchild Semiconductor Model No. DT$\mu c$ 932, modified to include individual transistors instead of integrated circuit elements and further modified to provide "conducting" and "nonconducting" impedance levels previously referred to. Such circuits are described in the Fairchild data sheets.

Other embodiments and alternative features will be obvious to those skilled in the art. Accordingly, the described embodiments shall be considered as illustrative only and in no way limiting the scope of the invention.

We claim:

1. In an electrographic apparatus, means for producing a coded binary output signal representative of information to be electrographically portrayed, means forming an array of separately energizable electrographic writing electrodes arranged over an electrographic recording medium for depositing a charge image pattern on the recording medium, such pattern containing the information to be recorded, means forming a diode decoding circuit connected in circuit intermediate said means for producing the coded binary output signal and said array of writing electrodes for decoding the binary output signal and for applying a writing potential to separately selected ones to said array of writing electrodes to produce the charge image pattern on the recording medium, THE IMPROVEMENT WHEREIN, said diode decoding circuit includes for each writing electrode; means forming a potential dividing network comprising a first impedance and a second impedance at least a few times greater than said first impedance, both connected in series across a source of the writing potential, one of said writing electrodes of said array connected to said potential dividing network intermediate said first and second impedances for applying the writing potential developed across said second impedance to said writing electrode, a series connection of a diode and a third impedance, said third impedance having an impedance which is only a fraction of said first impedance, said diode and said third impedance being connected in parallel with said second impedance for selectively shunting same, means for gating one set of signals to be decoded in series with said first and second impedances, means for gating a second set of writing signals to be decoded to said parallel branch intermediate said diode and third impedance for selectively biasing off conduction through said diode of said shunting parallel branch whereby both of said gating signals must be applied to said decoding circuit to cause a writing potential to be applied to said writing electrode.

2. The apparatus of claim 1 wherein said first and second impedances are resistors.

3. The apparatus of claim 2 including a second diode connected in said series potential dividing network intermediate said first and second resistors and in parallel with said parallel with the current flow through said parallel shunting branch, whereby said second diode blocks charging of the stray capacitance of said writing electrode through said parallel shunting branch, to increase the writing time of said writing electrode.

4. The apparatus of claim 1 wherein said first and second gating means have "non-writing" impedances large compared to said second and third impedances, respectively, and "-writing" impedances which are small compared to said second and third impedances, respectively.